W. F. BACH.
SELF SCOURING CRUSHING MACHINE.
APPLICATION FILED JAN. 21, 1920.
1,434,360.
Patented Nov. 7, 1922.
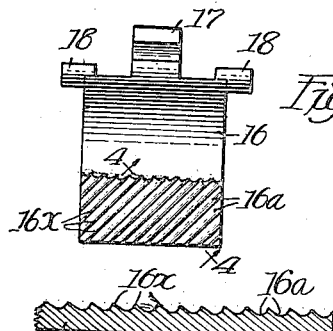
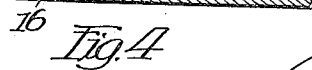
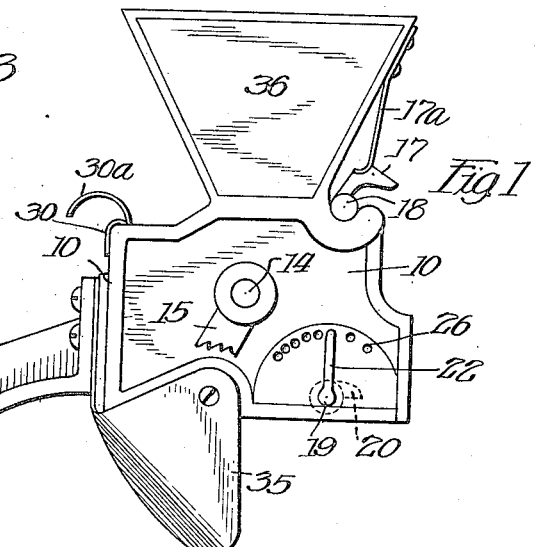
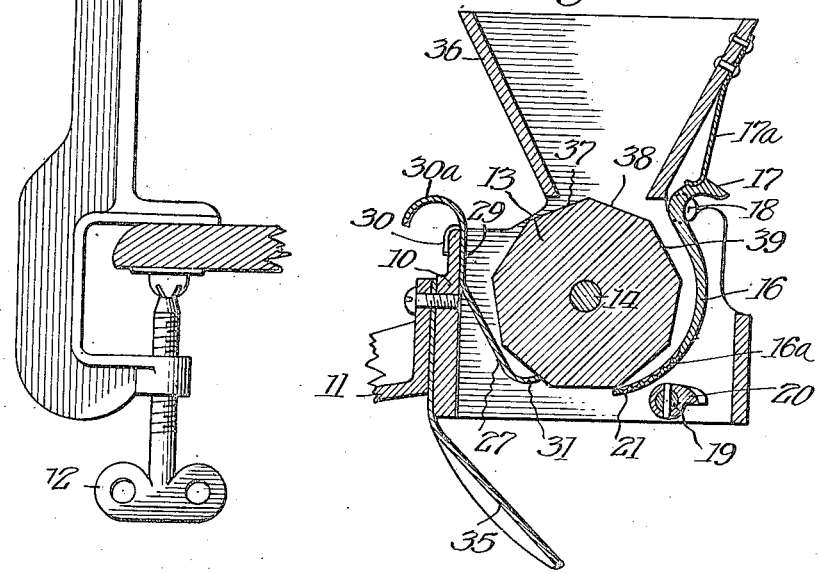
Inventor:
William F. Bach,
by attorney,
Paine Carpenter Patented Nov. 7, 1922.

1,434,360

UNITED STATES PATENT OFFICE.

WILLIAM F. BACH, OF CHICAGO, ILLINOIS.

SELF-SCOURING CRUSHING MACHINE.

Original application filed April 18, 1919, Serial No. 290,994. Divided and this application filed January 21, 1920. Serial No. 352,937.

*To all whom it may concern:*

Be it known that I, WILLIAM F. BACH, a citizen of the United States, and a resident of Chicago, in the State of Illinois, have invented certain new and useful Improvements in Self-Scouring Crushing Machines, of which the following is a specification, the present application being in part a division, and in part a continuation of my co-pending application, Serial No. 290,994, filed April 18, 1919.

My present invention relates in general to pressing machines and more particularly machines of such character which are used for crushing material and has special reference to the provision of an improved type of machine adapted for work upon material, which, owing to its form, consistency or inherent quality is difficult to manipulate and has a tendency to adhere to the crushing members.

While machines embodying my present invention are of utility for a wide range of purposes and are adapted for the manipulation of greatly varying classes of material, the present embodiment of my invention illustrates its application to a machine adapted for confectioner's use and more particularly one which may be utilized in crushing nut-kernels for the manufacture of confectionery and bakery goods generally For the purposes indicated, a machine which merely cracks the nuts into fragments, however small, does not fully answer the requirements, since it is also desired to crush the nuts as well as crack them to the end that the fondant or dough may tend to permeate the crushed nuts and that a more thorough admixture may be obtained. This is of advantage not alone to produce a homogeneous mass but also to permit more thorough cooking of the nuts on the one hand and diffusion of their flavor on the other hand.

A further advantage is that when the nut material is firmly united to the dough or fondant, the resultant product not only has less tendency to crumble but also remains fresh longer.

The principal objects, therefore, of my present invention are the provision of an improved form of pressing machine, adapted for breaking and crushing material; the provision of a machine so characterized which is especially adapted for manipulating resistant and compacting material; the provision of a machine of the class described having means for scavenging the pressing members; the provision in a pressing machine of a roll having angularly disposed flattened portions provided with means for removing any particles of the material pressed which may adhere to said roll; the provision of a machine of the character referred to wherein the stationary plate employed in conjunction with the pressing roll is so constructed and arranged as to be self-scouring; the provision of an improved form of cooperating pressing roll of polygonal cross-section and curved resistance plate and means co-operating therewith whereby the material to be acted upon may be readily drawn into position where such action may taken place and after such action readily removed therefrom, together with such other and additional objects as may hereinafter appear.

In attaining the foregoing objects and certain further benefits and advantages to be below pointed out and in overcoming certain objectionable features in such crushing devices as are known to me, I have provided a machine, one embodiment of which is illustrated in the accompanying drawing wherein—

Figure 1 is a side elevation of a machine embodying my present improvements;

Figure 2 is an elevational view, partly in vertical section of the machine of Figure 1;

Figure 3 is a view of the concave face of the curved resistance plate; and

Figure 4 is a sectional view thereof, taken on the line 4—4 of Figure 3.

With reference to Figure 1 of the drawing, it will be observed that for purpose of illustration, I have shown the machine in the form of a small hand actuated device for crushing nut-kernels in bakery practice. It will be noted that I have provided a casing, 10, with a suitable support, 11, such as a bracket having a set screw, 12, by which it may be affixed to a table.

Within the casing 10, is revolubly mounted a roll, 13, here shown as nonahedral in cross section. The roll, 13, is revolubly supported as by shaft, 14, in said casing, 10, the shaft, 14, being provided with a crank, 15, whereby the roll may be turned.

Adjacent to the roll, 13, is disposed a plate, 110

16, having a curved contour which is substantially equal to a segment of cylinder whose longitudinal axis is different from that of the roll, 13, and also having a number of grooves 16ª. These grooves are disposed at an angle of about 45° to the path of movement of the periphery of the roll 13 and are provided with relatively sharp edges 16ˣ directed upwardly in the position of the machine shown in Figure 2. It is of importance that the ends of the grooves 16ª be uninterrupted and open. The purpose of this precise arrangement is hereinafter more fully described in connection with the description of the operation of the device.

The plate, 16, may be pivotally supported on the casing, 10, in any convenient manner as by a supporting rod, 18, removably disposed in suitable sockets therein. The plate, 16, is conveniently formed with a finger-lift hook, 17, upon which a spring, 17ª, presses and serves to hold the plate, 16, from accidental displacement.

For varying the relation of the plate, 16, to the roll, 13, I employ an oscillating shaft, 19, having an eccentric portion, 20, adapted to bear against the lower portion, 21, of the plate, 16.

For oscillating the shaft, 19, I arrange externally of the casing, 10, an arm, 22 fixed thereto, and provided with an inwardly turned extension adapted to enter, alternately, the several apertures of the series thereof arranged on the quadrant indicated at 26 when said arm, 22, is oscillated in varying the relation of the portion, 21, of the plate, 16, with respect to the roll, 13 by means of the eccentric 20. A spring (not shown) is arranged between the wall of the casing 10 and the end of the eccentric, 20, in order to hold the extension of the arm 22 in one of the holes, 26, and thereby the plate, 16, in predetermined relation to the roll 13.

For scavenging the roll, 13, I employ a suitable scraper device, 27, here shown as a bent-plate whose upper end is provided with a hooked portion, 30, adapted to grasp the upper margin of the casing, 10. The scraper, 27, is preferably formed of a sheet of yieldingly resistant material supported with its lower margin, 31, against the roll, 13. A finger-lift hook, 30ª, is provided for the ready removal of scraper 27.

For holding the lower edge, 31, of the scraper, 27, against the roll, 13, at all times, notwithstanding the presentation of roll contours, which are at different distances from the axis of the roll, I find it convenient to insert the scraper, 27, under compression so that its upper portion, 29, may rest against the casing, 10, and lower edge, 31, rest against the perimeter of the roll, 13, at all times.

In the operation of the machine illustrated in the drawing, the roll, 13, is rotated clockwise by means of the crank, 15, and nut-kernels are fed into the machine by means of the hopper, 36. As they fall upon the roll faces, 37 and 38, they tend to come into position adjacent to the face indicated at 39, and as such roll faces, 39, 38 and 37, are successively brought nearer to the plate, 16, by the turning of the roll, 13, the nut-kernels are forced against the plate, 16, and the sharp edges, 16ˣ, of the grooves 16ª so retard their movement that they are crushed between said roll, 13, and plate, 16. As they are drawn past the lower margin of the plate, 16, by the roll, 13, the roll faces are acted upon by the edges, 31, of the scraper, 27, which thus removes any adhering particles of the crushed nut-kernels.

As above suggested, it is of importance that the grooves 16ª be free of obstruction throughout their length and that they have open ends. This is quite requisite to the satisfactory operation of the machine for the reason that while the grooves 16ª are demanded for the crushing and separation of the nut-kernels, still as the nut-kernels are crushed they tend to clog the grooves 16ª, unless the crushed material may be pushed from such grooves by the on coming quantity of crushed material and this cannot be efficiently done unless the grooves are open at their lower ends, that is, at the free end, 21, of the plate 16.

It is believed that the advantages of my improved pressing machine over the use of either a single or double roll roller, whether used in connection with a flat surface or embodied in a machine, will be quite fully evident to those who are skilled in the art to which my invention pertains.

Such persons will appreciate that in machines embodying my invention, little chance is offered for the loss of material as by the nut-kernals jumping away from the roll 13, at the time pressure is first exerted thereupon by such roll.

Having thus described my invention and illustrated its use, what I claim as new and desire to secure by Letters Patent is:

1. A crushing machine, comprising, in combination, opposed plate and roll crushing means, and means for imparting relative movement therebetween, the plate being provided with a grooved portion having thereon angularly disposed open-ended grooves leading from the top to the bottom of such portion, and the roll being so arranged that material may be drawn in between the roll and plate and crushed against the grooved portion of the plate as the said relative movement is imparted.

2. A crushing machine, comprising, in combination, opposed abutment means and roll crushing means, and means for imparting relative movement therebetween, the abutment means being provided with a grooved portion having thereon angularly disposed grooves leading from the top to the bottom of such portion and open at their ends, and the roll being so arranged that material may be drawn in between the roll and abutment means and crushed against the grooved portion of the abutment means as the said relative movement is imparted.

3. A crushing machine, comprising, in combination, opposed plate and roll crushing means, and means for imparting relative movement therebetween, the plate being provided with angularly disposed open ended grooves extending from the top to the bottom of the grooved portion of said plate, and the roll being so arranged that material may be drawn in between the roll and plate and crushed against the grooved portion of the plate as the said relative movement is imparted, said grooves each having one side steeper than the other, to produce cutting edges and guiding channels.

4. A crushing machine comprising, in combination, opposed plate and roll crushing means, and means for imparting relative movement therebetween, the plate being provided with angularly disposed open ended feeding grooves, and the roll being provided with flattened portions whereby material may be drawn in between the roll and plate and crushed against the grooved portion of the plate as the said relative movement is imparted.

5. A crushing machine comprising, in combination, opposed plate and roll crushing means, and means for imparting relative movement therebetween, the plate being provided with angularly disposed open ended feeding grooves, and the roll being provided with flattened portions whereby material may be drawn in between the roll and plate and crushed against the grooved portion of the plate as the said relative movement is imparted, and means for varying the distance between the roll and plate.

6. A crushing machine comprising, in combination a casing, opposed plate and roll crushing means, the plate being provided with angularly disposed open ended grooves having relatively sharp edges disposed toward said roll, and so arranged that as material passes between the roll and plate it is caught by said edges and is crushed as further relative movement takes place between the roll and plate, the crushed material being fed along the grooves and discharged from the lower end of the plate.

7. A crushing machine comprising, in combination, a casing, opposed plate and roll crushing means, the roll being polyhedral in cross section, and the plate being provided with angularly disposed open ended feeding grooves having relatively sharp edges disposed toward said roll, and so arranged that as material passes between the roll and plate it is caught by said edges and is crushed as further relative movement takes place between the roll and plate, means for varying the distance between the roll and plate, and a scraper yieldingly resistantly contacting with the roll for removing from the roll any material adhering thereto as the roll portion passes away from the plate.

In testimony whereof I have hereunto signed my name.

WILLIAM F. BACH.